United States Patent [19]
O'Connor

[11] 3,822,769
[45] July 9, 1974

[54] PANHEAD DRAG MECHANISM

[76] Inventor: Chadwell O'Connor, 2024 Galaxy Dr., Pasadena, Calif. 92660

[22] Filed: Sept. 27, 1972

[21] Appl. No.: 292,789

[52] U.S. Cl. ............................. 188/290, 192/58 B
[51] Int. Cl. ............................................. F16d 57/04
[58] Field of Search...... 188/290; 74/199; 192/58 B, 192/58 C

[56] References Cited
UNITED STATES PATENTS
2,591,753  4/1952  Wildhaber ........................... 74/199
3,362,510  1/1968  Nash .................................. 188/290

FOREIGN PATENTS OR APPLICATIONS
1,804,033  5/1970  Germany ............................ 188/290

Primary Examiner—George E. A. Halvosa
Attorney, Agent, or Firm—Wolfe, Hubbard, Leydig, Voit & Osann, Ltd.

[57] ABSTRACT

A panhead for mounting, panning and tilting instruments such as cameras having a smooth, uniform drag mechanism, requiring virtually no initial extra breakaway force, in which drag resistance is provided between a shaft and a relatively rotatable housing by the interaction between a plurality of disks fixed perpendicularly on the shaft and a stack of drag plates mounted to slide into interleaved relationship with the disks. The disks and plates are surrounded by a viscous fluid and are closely spaced, on the order of 0.001 of an inch, but not in contact. A worm drive for positioning the plates holes them in adjusted position.

4 Claims, 7 Drawing Figures

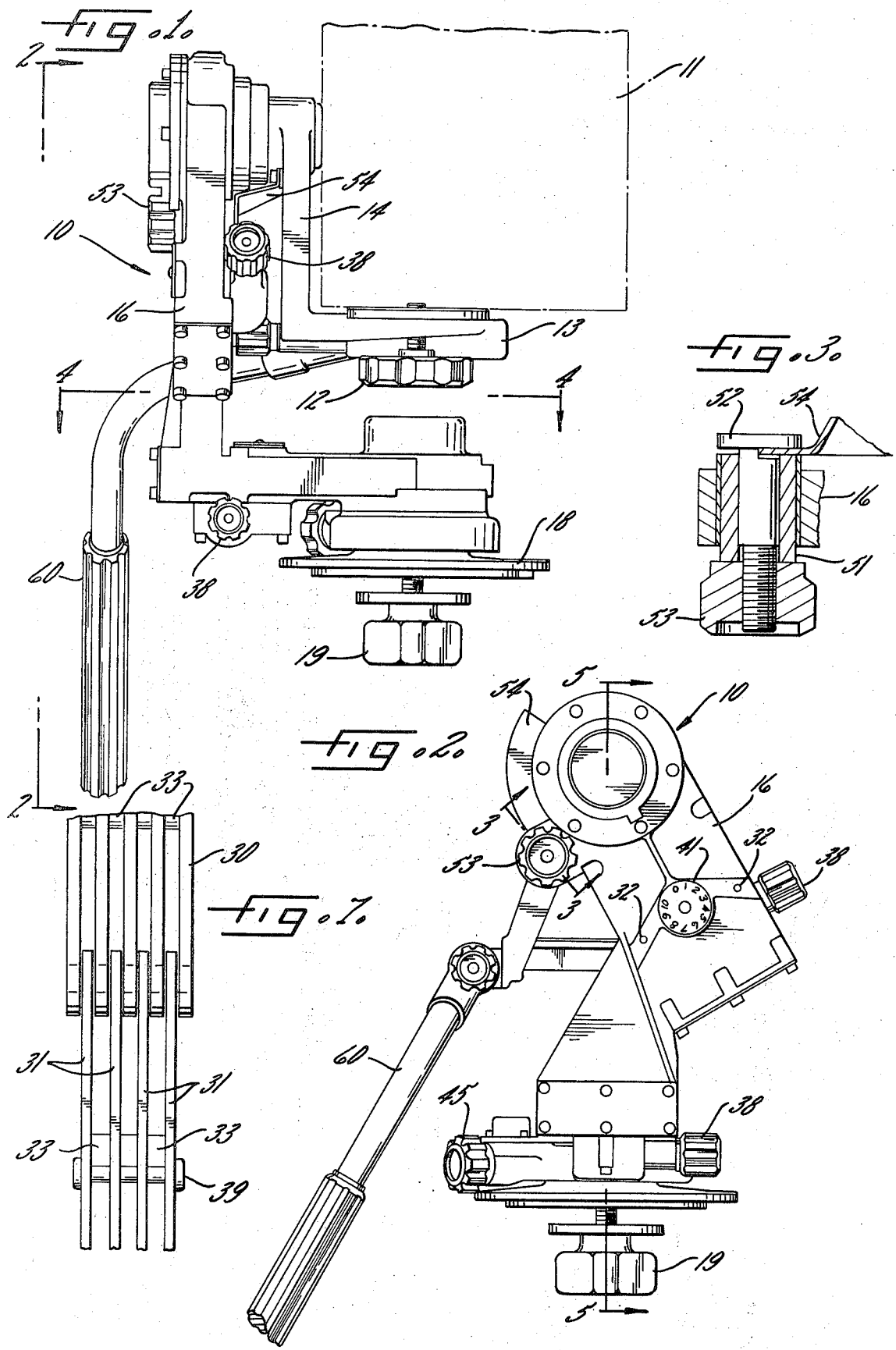

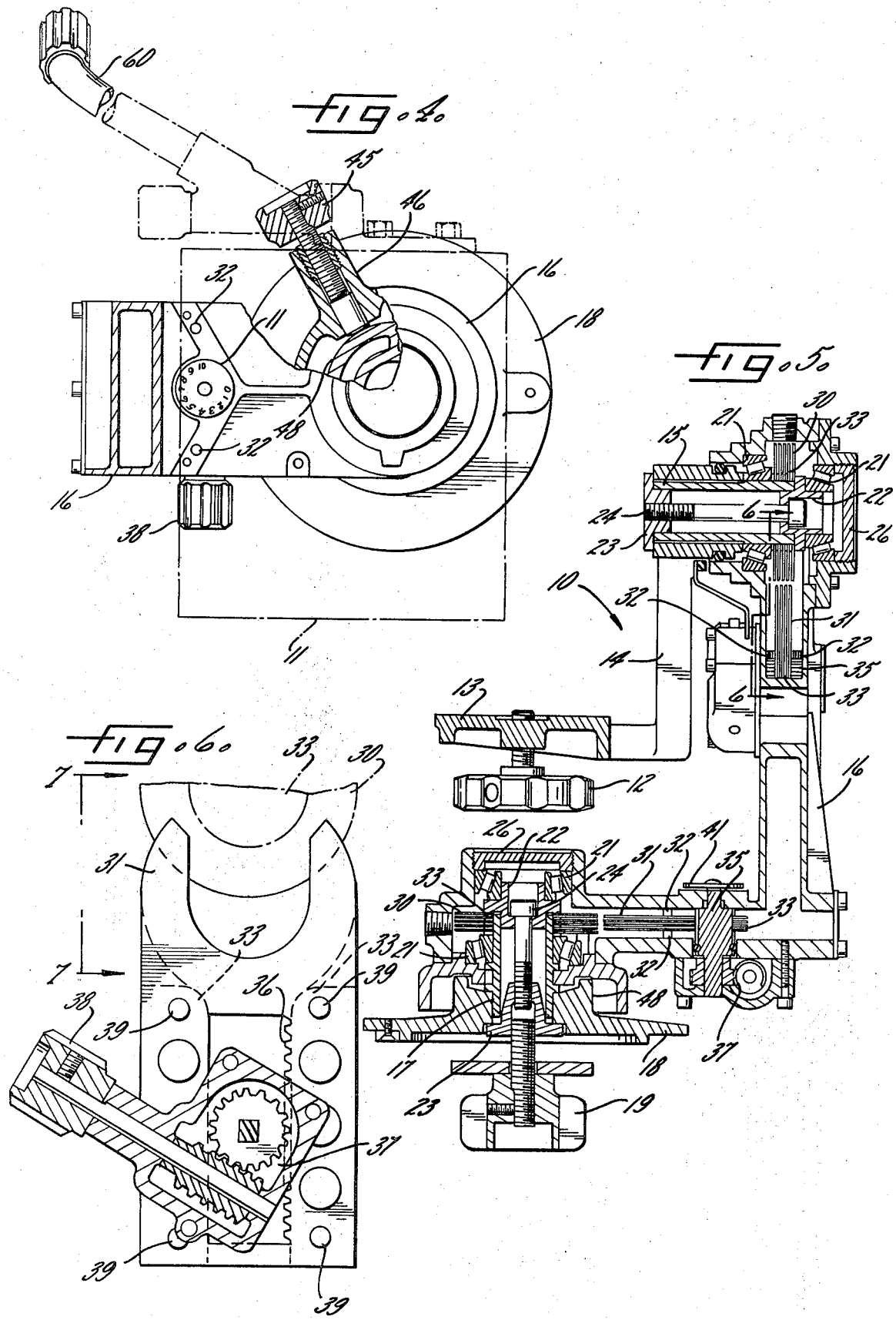

PANHEAD DRAG MECHANISM

This invention relates generally to instrument panheads and more particularly concerns a drag mechanism for such panheads.

An instrument panhead is that structure mounted between a stationary, although perhaps portable, base and an instrument such as a camera which gives the instrument user the ability to tilt and pan the instrument about horizontal and vertical axes. Panheads, particularly those intended for movie cameras, usually embody a drag mechanism to create an artificial resistance to instrument movement which, desirably, is both adjustable and constant. The effect is to obtain smooth, uniform rotation about the panhead axes at a rate dependent upon the direction and amount of force exerted by the instrument user.

A disturbing characteristic of many drag mechanisms is the fact that their initial resistance to movement is higher than after movement commences, i.e., there is an initial apparent sticking effect requiring some breakaway force to overcome that is above what is required to cause continuous steady movement. As a result, it is difficult, when using a movie camera for example, to be filming with a fixed camera and then slowly begin camera tilting or panning without an initial bit of jerk before the breakaway force can be removed by the operator and a lesser steady moving force established. The problem created by drag mechanism breakaway force in camera panheads is accentuated by the modern trend toward using smaller, lightweight cameras that provide little inertia stability which could tend to cancel out the start-up jerk effect.

Accordingly, it is the primary aim of the invention to provide an instrument panhead having a drag mechanism which exhibits virtually no breakaway force resistance so that the application of tilting or panning forces causes smooth, immediate movement at a rate proportional to the force exerted.

It is also an object of the invention to provide a panhead and mechanism as referred to above which gives the user a very wide range of drag force settings, so that the user can obtain the operating characteristics he prefers, without affecting the low breakaway force characteristic of the mechanism. A collateral object is to provide such a panhead and mechanism in which little effort is required to adjust the drag force through its entire selectable range.

Another object is to provide a panhead and mechanism of the above type which is quite compact, and more economical to manufacture, as compared with prior panheads intended to handle instruments of comparable size and weight.

Other objects and advantages of the invention will become apparent upon reading the following detailed description and upon reference to the drawings, in which:

FIG. 1 is a front elevation of a panhead embodying the invention;

FIG. 2 is a side elevation taken along the line 2—2 in FIG. 1;

FIG. 3 is a partial enlarged section taken approximately along the line 3—3 in FIG. 2;

FIG. 4 is an enlarged section taken approximately along the line 4—4 in FIG. 1;

FIG. 5 is a vertical section taken approximately along the line 5—5 in FIG. 2;

FIG. 6 is an enlarged fragmentary section taken approximately along the line 6—6 in FIG. 5; and FIG. 7 is a further enlarged partial section taken approximately along the line 7—7 in FIG. 6.

While the invention will be described in connection with a preferred embodiment, it will be understood that I do not intent to limit the invention to that embodiment. On the contrary, I intend to cover all alternatives, modifications and equivalents as may be included within the spirit and scope of the invention as defined by the appended claims.

Turning to the drawings, there is shown in FIG. 1 a panhead 10 embodying the invention adapted to support an instrument such as a camera 11 for panning and tilting movement. The camera 11 is secured by a holddown screw 12 on a platform 13 having a vertical arm 14 on which a shaft 15 is fixed that is rotatably fitted in the upper end of a substantially L-shaped housing 16 so as to define the tilting axis of the panhead. The horizontal portion of the L-shaped housing 16 rotatably receives a shaft 17 that is fixed to a base 18 so as to define the panning axis of the panhead. The base 18 is secured to an underlying support, not shown, by a tiedown knob and screw assembly 19.

In somewhat more detail, tapered bearings 21 are fitted within the housing 16, and the shafts 15, 17 are locked to one of the bearings 21 and to the platform 14 and the base 18, respectively, by collars 22 and nuts 23 drawn firmly together by bolts 24 so as to sandwich and firmly lock the inner race of one of the bearings 21 to each of the respective shafts 15, 17 as well as locking those shafts to the platform 14 and the base 18, respectively. The other thrust bearings 21 of the respective pairs are seated on the collars 22 and urged axially of the shafts by threaded plugs 26 so as to take up clearances and establish wobble-free axes of rotation, as well as close and seal the housing 16.

In accordance with the invention, variable drag force is established resisting relative rotation of the shafts 15, 17 and the housing 16 by a plurality of circular disks 30 mounted in closely spaced relationship on each of the shafts 15, 17 so that the disks are normal to the shaft axes, a plurality of plates 31 are stacked in spaced relationship so that they can be interleaved between the disks 30 without contact, and the housing 16 is filled with a viscous fluid so as to surround the interspaced disks and plates. The stacks of plates 31 are supported within the housing 16 between opposing set screws 32 so that they can be moved toward and away from the respective shafts 15, 17, and the ends of the plates 31 are bifurcated (see FIG. 6) so that, in one limit position, the plates 31 embrace the respective one of the shafts 15, 17 and major portions of the disks are interleaved with the plates while, in the opposite limit position, only the bifurcated tip ends of the plates 31 interleave with the plates.

While the interspaced plates 31 and the disks 30 do not touch, they are quite closely spaced with the opposing surfaces being preferably ground flat and held by spacers 33 so that the opposing surfaces have a clearance on the order of 0.001 of an inch, which clearance is filled with the viscous fluid. The fluid has, preferably, a viscosity on the order of 1½ million centistokes and it has been found that capillary force maintains this fluid, and thus the spacing, between the opposing surfaces of the disks and the plates. The set screws 32 are adjusted so that the stacks of plates 31 are held normal to the respective shafts 15, 17 and thus the surfaces of the plates and the disks 30 are held parallel to one another.

As a feature of the invention, the stacks of plates 31 are adjusted toward and away from the respective shafts 15, 17 by spur gears 35 journaled in the housing 16 and meshing with rack teeth 36 formed on the plates 31, with the spur gears 35 being driven by worm gearing 37 of which the worm is rotated by knobs 38 accessible from the exterior of the housing 16. Because the plates 31 and the disks 30 do not touch, little force is required to rotate the knobs 38 and establish any desired amount of overlapping between the respective sets of plates 31 and disks 30, and despite this finger-tip control the worm gearing 37 in each case maintains the adjusted position of the stacks of plates 31.

Preferably, the spacers 33 separating the plates 31 of each stack are formed in strips running along the long edges of the plates with the entire stack being firmly secured together by rivets 39. In the illustrated embodiment, the rack teeth 36 are formed on each of the plates 31 and on one of the spacers 33 of each pair between the plates. The disks 30 and their spacers 33 are locked on the respective shafts 15, 17 by being clamped between one of the bearings 21 and the adjacent one of the collars 22. So as to indicate the adjusted positions of the plates 31, disks 41 bearing suitable indicia are mounted externally of the housing 16 for rotation with the spur gears 35 so that the positions of rotation, and thus the positioning of the plates 31, become clearly visible to the user of the panhead 10.

In order to lock the platform 13 in an adjusted position, a pan brake knob and screw 45 is threaded into a collar 46 formed integrally with the housing 16 so as to urge, upon rotation of the knob 45, a brake plug 47 into frictional locking engagement with a cylindrical surface 48 on the base 18. Somewhat similarly, a sleeve 51 is anchored in the upper portion of the housing 16 and carries a slotted bolt 52 on which a tilt brake knob 53 is threaded so that, upon rotation of the knob 53, the periphery of an arcuate brake plate 54 mounted on the platform 13 is clamped between the sleeve 51 and the end of the slotted bolt 52. Pan locking is effective through 360° as the surface 48 is cylindrical, whereas in the preferred construction the brake plate 54 extends approximately 180° about the tilt axis so that tilt locking through that range is possible.

For facilitating instrument movement, an elongated handle 60 is adjustably secured to the platform 13.

The disk 30 and plate 31 drag mechanism has been found to require virtually no initial or extra breakaway force to begin platform movement, for reasons which are not too clear. With little overlapping of the plates 31 and the disks 30, there is minimum drag resistance to relative rotation between the housing 16 and the shafts 15, 17, and with substantial overlapping of the plates and the disks the drag effect resisting rotation is considerably increased. In each case, the resistance is quite smooth and constant, whether the platform 13 has just begun movement from a fixed position or not. This is probably because the drag resistance created results from shearing friction within the fluid itself, and thus there is no initial sticking of any solid elements to overcome. In any event, even very light pressure on the handle 60 produces platform movement that is smooth, uniform, and proportional to the force exerted. It is also true that the mechanism described gives a very wide range of drag resistance dependent upon the setting of the overlapping relationship of the plates 31 within the disks 30.

Those skilled in the art will appreciate that the panhead 10 is quite compact and, because the design is relatively simple, economical to manufacture.

I claim as my invention:

1. In a panhead having a housing into which a shaft is rotatably fitted, the combination comprising, a plurality of circular flat disks of substantially uniform thickness mounted in closely spaced relationship on said shaft with the disks being normal to the axis of the shaft, a plurality of flat plates of substantially uniform thickness stacked in spaced relationship so that the plates can be interleaved between said disks without contact and with a uniform clearance therewith, means supporting said plates in said housing for movement toward and away from said shaft, an adjustable control accessible from outside of said housing for moving said plates into variable overlapping relationship with said disks, and a viscous fluid in said housing surrounding said overlapping disks and plates so that a substantially constant force against relative rotation between said housing and said shaft is established, which force varies with the amount of disk-plate overlapping.

2. The combination of claim 1 in which said adjustable control includes a spur gear coupled to rack teeth on said plates and worm gearing for manually rotating said spur gear from outside of said housing.

3. The combination of claim 1 including guide members adjustably fitted in said housing for bearing on opposite sides of said plurality of plates so as to permit shifting the plates axially of said shaft, said plates and said disks having their overlapping portion separated from one another by the capillary action of said fluid, and said guide members being adjusted so that the plates are parallel to said disks.

4. The combination of claim 3 in which the opposing surfaces of said plates and said disks are spaced about 0.001 of an inch.

* * * * *